United States Patent

[11] 3,552,465

[72] Inventors Jean-Jacques Asper;
Gunter Breitling, Petit-Lancy, Geneva,
Switzerland
[21] Appl. No. 722,842
[22] Filed Apr. 22, 1968
[45] Patented Jan. 5, 1971
[73] Assignee Pates Alimentaires Rivoire & Carret
Marseille, France
[32] Priority Apr. 21, 1967
[33] Switzerland
[31] No. 5761/67

[54] INSTALLATION FOR PROCESSING GRAINS WITH A LIQUID, IN PARTICULAR CEREAL GRAINS
1 Claim, 5 Drawing Figs.
[52] U.S. Cl................................................ 146/256,
146/221.9
[51] Int. Cl.................................................. B02b 3/12
[50] Field of Search........................................ 146/256,
289, 276, 290, 50, 49.1, 221.8, 233, 234, 288,
221.9; 144/208—2

[56] References Cited
UNITED STATES PATENTS
787,108 4/1905 Oliver........................... 146/256
FOREIGN PATENTS
1,909 5/1877 Great Britain................ 146/256
5,686 3/1892 Great Britain................ 146/256

Primary Examiner—Andrew R. Juhasz
Assistant Examiner—Z. R. Bilinsky
Attorney—Waters, Roditi, Schwartz & Nissen ABSTRACT: An installation for processing grain with a liquid comprises one or more processing units, each unit including a frustoconical drum mounted for rotation about a horizontal axis so that grain introduced at the broad end of the drum through a central inlet opening first comes into contact with a processing liquid contained in the lowermost portion of the drum and then is moved out of the liquid towards the narrow end of the drum under the action of a helical partition mounted inside the drum and axially thereof, so as first to drain the grain and then to discharge the grain through the narrow end of the drum to the drum of any subsequent processing unit.

INSTALLATION FOR PROCESSING GRAINS WITH A LIQUID, IN PARTICULAR CEREAL GRAINS

The present invention provides an installation for processing grains with a liquid, in particular cereal grains.

As is known, it is often necessary necessary, in industry, in particular in the food industry, to subject granular materials, in particular cereal grains, to a processing operation with a liquid. The purpose of such a processing operation can be to hydrate, to wash, etc., cereal grains. In particular, such a processing operation can be effected with a view to peeling chemically wheat grains in such a way as to separate the husks from the grains as such while keeping the layer of aleurone lying immediately beneath the husk intact. The chemical peeling of wheat grains requires several processing operations with a liquid, which operations consist successively in hydrating the grains, in subjecting them to the action of an alkaline chemical attacking agent, in detaching the husks through rinsing while at the same time strongly stirring the grains, in separating the husks from the grains through washing, in neutralizing the excess of remaining alkaline attacking agent and in washing the peeled grains. It is clearly of advantage to subject the grains to such processing operations in continuous manner.

This is precisely the case with the installation according to the present invention, which enables large quantities of grain to be processed in continuous manner. By placing several processing units corresponding to various embodiments of the installation according to the invention in series, wheat grains can be peeled in excellent conditions by the chemical peeling method. This installation is characterized in that it comprises at least one processing unit consisting of a horizontally disposed frustoconical drum, the large base of this drum being formed by a wall provided with a central grain inlet orifice, the small base forming the outlet orifice for the grains, an internal helical partition being arranged along the entire length of the drum and being rendered solid therewith, the pitch of the screw formed by this partition increasing progressively in the direction of the outlet orifice, and means for feeding grains and fluid, respectively, for draining the grains and for rotating the drum about its longitudinal axis, the arrangement being such that the grains introduced through the inlet orifice may, upon rotation of the drum, progressively be moved at a constant flow rate towards the outlet orifice by the helical partition while at the same time remaining in contact with the liquid at the lower portion of the drum, being drained in the other portion of the drum and being discharged through the outlet orifice.

The accompanying drawing illustrates diagrammatically and by way of example four embodiments of the installation according to the invention which comprise a single processing unit as well as an embodiment of the installation which comprises several processing units.

FIG. 1 shows a first embodiment of the installation according to the invention which comprises a single processing unit and which is particularly suitable for hydrating cereal grains.

Figure 1:
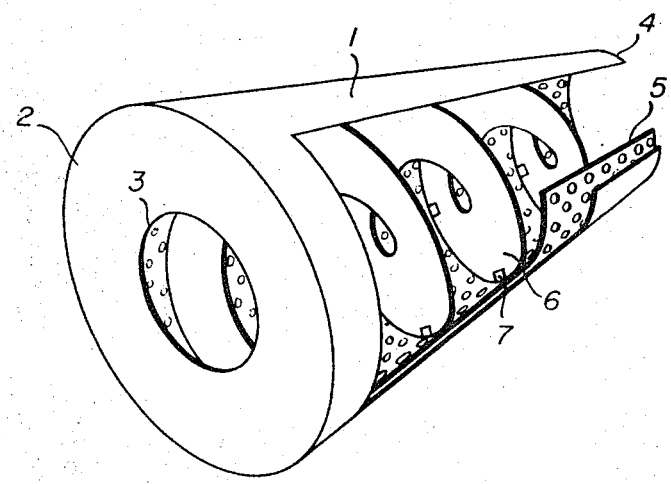
FIG. 1 illustrates a first embodiment of the installation which comprises a single processing unit and which is represented as a partially exploded perspective view to show the internal arrangement thereof.

The processing unit of the installation shown in FIG. 1 comprises a frustoconical drum 1 made of thin but rigid sheet metal. The large base of the cone frustum is closed off by a wall 2 in the middle of which is formed a circular opening 3. The small base 4 of the cone frustum is open and forms an outlet orifice. The diameter of the circular opening at the large base of the cone frustum is slightly greater than that of the small base of said cone frustum so that it is possible to connect in series several of the processing units by fitting the narrower end of one drum into the opening at the large base of the following drum. A second drum 5, which is made of thin and rigid sheet metal and in the wall of which are formed a large number of perforations having a size slightly smaller than the grains to be processed fully, lines the whole interior of the first drum. The gap between the two drums is just enough to enable the processing liquid easily to flow towards the large base of the frustoconical drum. Clearly the perforated wall could also only line a portion of the interior of the drum.

A partition 6, made of thin and rigid sheet metal and of helical shape, is fixed inside the drum so as to form an integral and undeformable assembly with the latter. The method of assembly can be any one of the known assembly methods. In this instance, the helical partition is fixed to the inner drum having the perforated wall by means of assembly members 7, which are bent at right angles to form an L and which are screwed to the partition. The helical partition could also be force-fitted so as to be wedged in place. The pitch of the screw formed by the helical partition progressively increases towards the small base of the frustoconical drum, so as to enable a mass of grain to move forward at a constant flow rate in the longitudinal direction when the drum is rotated about its longitudinal axis.

Figure 2:
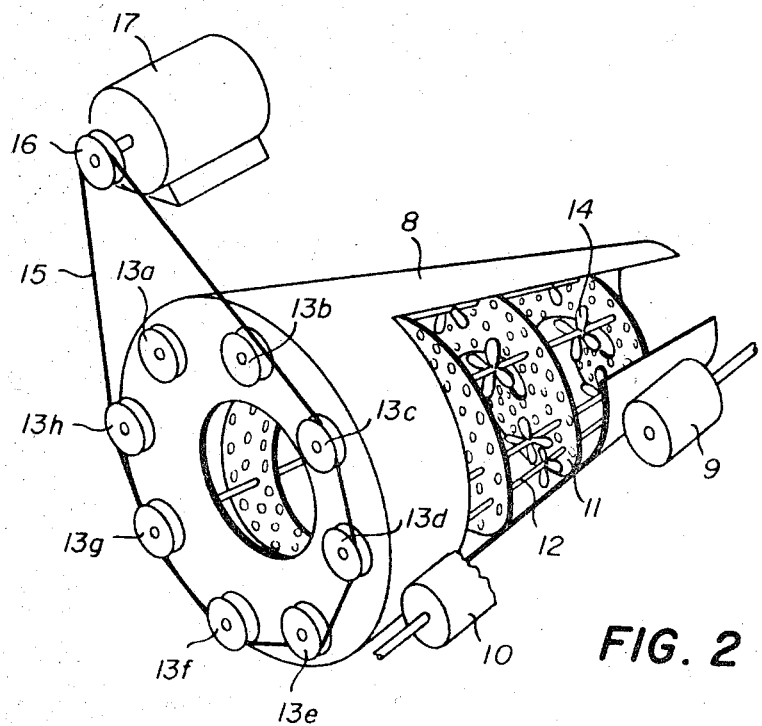
FIG. 2 is a partially exploded perspective representation of a second embodiment of the installation according to the invention, which comprises a single processing unit.

The drum is so positioned that its longitudinal axis lies horizontally and, to this end, is mounted on suitably arranged rollers or wheels. The manner in which such rollers are arranged is shown in FIG. 2 which shows a second embodiment of the installation according to the invention Suitable means, not shown in FIG. 1, enable the drum to be rotated at the desired speed, for instance by rotatably driving by means of one or more motors at least one of the rollers or one of the wheels supporting the drum.

Suitable means, not shown in FIG. 1, enable fluids, e.g. water, steam, more or less concentrated solutions of an alkali or of an acid, to be supplied. Fluid discharge means can also be fitted to the processing unit. These means consist, for example, of ducts which enter through one of the two openings of the drum and which are provided at their ends with one or more orifices enabling the distribution of the fluid on to the grain to be processed, in particular the sprinkling of these grains by a spray of liquid.

The installation according to the embodiment which is shown in FIG. 1 and which is provided with a water supply duct inside the drum and with means for rotating the drum about its longitudinal axis in a horizontal position is of particular advantage for hydrating cereal grains.

The operation of this installation is as follows:

The grains to be hydrated are continuously introduced through orifice 3. They are then taken in charge by the helical partition 6 and conveyed towards the outlet orifice 4 of the cone frustum at a speed which is dependent on the pitch of the screw formed by said helical partition and on the rotational speed of the drum. Conveyance in the required direction is achieved by rotating the drum in a direction opposite to that in which the screw formed by the helical partition is turned.

Water at ambient temperature is introduced into the drum at a rate which is proportional to the amount of grain being processed so that the amount of water which is absorbed by the grains and which continuously leaves the drum together with the grains may constantly and exactly be renewed and that the total amount of water which is present in the hydration unit may remain constant. In order to ensure good hydration of the grains, it is of advantage to keep the grains in a water bath in a portion of the drum.

Because of the frustoconical shape of the drum and of the horizontal arrangement of the longitudinal axis thereof, the grains are progressively raised, while being conveyed by the partition under the rotational action of the assembly, above the level of the water bath after having been kept in this bath for the desired length of time, this being achieved by suitably determining the dimensions of the drum, the level of the water bath, the pitch of the screw formed by the helical partition and the rotational speed of the drum. The excess water is drained off in the portion of the drum which does not contain liquid. While being conveyed, the grains are subjected to a certain relative agitation and to mutual rubbing.

It is obvious that the amount of water that is present in the drum could be reduced so as not to have a water bath but so as to soak the grains with the amount of water that is just necessary.

FIG. 2 shows a second embodiment of the installation according to the invention which comprises a single processing unit and which is of particular advantage when the grains to be processed must be subjected to a strong stirring action, in particular with a view to detaching their superficial layer by mutual rubbing.

This processing unit comprises a frustoconical drum 8 which is supported by two pairs of frustoconical rollers. Two of these rollers, i.e. rollers 9 and 10, are shown in FIG. 2.

Drum 8 does not have a double perforated wall but the draining off of the liquid remains possible since the internal helical partition 11 is no longer made of solid sheet metal but of sheet metal provided with perforations having a size slightly less than the smallest size grains to be processed.

Rotary shafts 12, which are driven by pulleys 13a to 13b, extend through the drum longitudinally thereof and carry each a plurality of screws blades 14, which are intended to impart to the grains to be processes an additional stirring action. These shafts are eight in number in the embodiment shown in FIG. 2 but clearly any other number could be used. Rotation of the shafts carrying the stirring blades is provided for by passing a belt 15 in the grooves of the pulleys so that only those pulleys which reach the lower portion of the drum upon rotation thereof may be driven. This is achieved by passing the said belt over a pulley 16 which serves to drive this belt and whose axis of rotation is parallel to the axis of rotation of the drum and is located above this latter axis of rotation. This pulley for driving the shafts carrying the stirring blades is driven by a motor 17.

The rubbing action exerted on the surface of the grains could be further increased by lining the whole or a part of the inner wall of the drum and/or the walls of the helical partition with an abrasive coating, e.g. abrasive felt.

Figure 3:
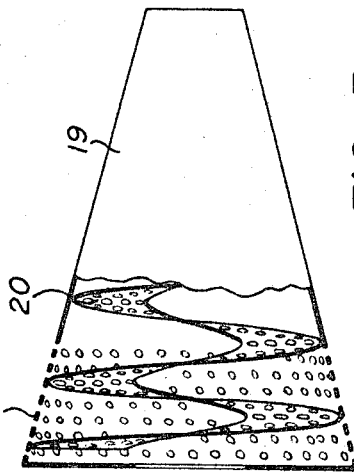
FIG. 3 is a partial longitudinal section of a third embodiment of the installation according to the invention, which comprises a single processing unit.

FIG. 3 shows a third embodiment of the installation according to the invention which comprises a single processing unit and which is of particular advantage when it is required to process grains in a large volume of liquid, for instance to wash them.

The frustoconical drum 19 comprises a perforated annular zone 18 formed in its wall in the vicinity of its large base. This perforated annular zone enables the inside of the drum to communicate with a liquid filled container, not shown, into which dips the portion of the drum adjacent the large base thereof.

The size of the perforations is slightly less than the smallest sized grains to be processed. The internal helical partition 20 is similarly perforated.

Figure 4:
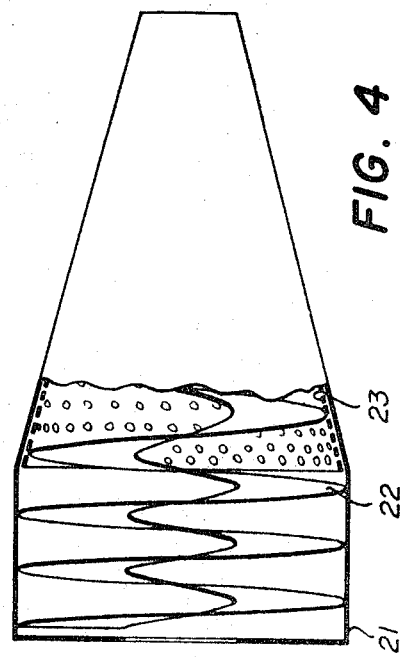
FIG. 4 is a partial longitudinal section of a fourth embodiment of the installation according to the invention, which comprises a single processing unit.

FIG. 4 shows, in partial section, a fourth embodiment of the installation according to the invention which comprises a single processing unit and which is of particular advantage when it is desired to subject the grains to the process by a liquid over a particularly long period of time.

This embodiment comprises a cylindrical drum 21 which extends the frustoconical drum. The walls of this drum are made of rigid sheet metal. The wall which closes off the base of the frustoconical drum in the embodiments shown in FIGS. 1 to 3 is here moved to the free end of the cylindrical drum. The pitch of the helical partition 22 is constant along the portion which extends into the cylindrical drum. An internal wall 23 similar to the wall 5 described in FIG. 1 enables the grains to drain in the frustoconical drum.

The function of the cylindrical drum is to form a zone in which the grains are in contact with the processing liquid. The length of time during which this contact occurs is proportional to the length of the cylindrical portion and inversely proportional, for a given value of the pitch of the helical partition, to the rotational speed of the drum.

Clearly, embodiments can be envisaged for the basic unit of the installation other than those described above, in particular by combining in different ways the elements belonging to these embodiment.

Figure 5:
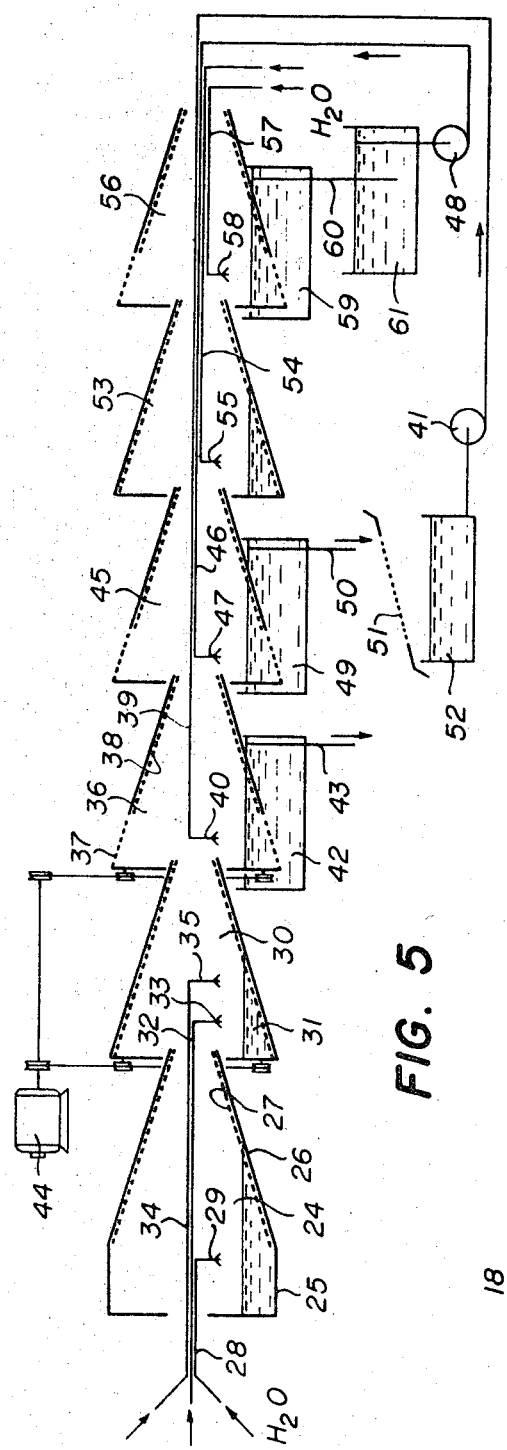
FIG. 5 is a partial longitudinal section of a fifth embodiment of the installation according to the invention, which comprises six processing units.

FIG. 5 shows in longitudinal section an installation according to the invention comprising six processing units which are so combined as to effect peeling of wheat grains according to the chemical peeling method.

This installation comprises a first unit 24 for hydrating the grains. This first unit is identical to the processing unit of the fourth embodiment of the installation, described above. It includes a cylindrical drum 25 and a frustoconical drum 26 having walls made of rigid sheet metal. The helical partition, which is not shown in FIG. 5, is made of rigid, unperforated, sheet metal. A second drum having a perforated wall 27 lines the first frustoconical drum internally. The water is supplied by a duct 28 and a spraying orifice 29 which pours, in this instance, the water into the cylindrical drum. A sufficient amount of water is maintained to enable the mass of grains fully to bathe in the water.

The second processing unit 30 of the installation, for chemically attacking the grains, combines elements of the first embodiment and elements of the second embodiment.

Thus, this processing unit comprises a second drum having a perforated wall 31 to enable draining of the grains and an unperforated helical partition, as in the first embodiment, as well as the stirring means described in the second embodiment. A duct 32 and a sprinkling orifice 33 enable a solution of the attacking agent, here a 20 percent solution of soda, to be introduced into the drum. Another duct 34 and a suitable orifice 35 feed into the drum steam at 100° C. for maintaining the processing temperature therein at 80° C.

The third processing unit 36 comprises, as in the third embodiment described above, a perforated annular zone 37. The helical partition, not shown in FIG. 5, is made of unperforated sheet metal and the drum comprises, except in the portion where the perforated annular zone is located, a double perforated inner wall 38.

A duct 39 ended by a sprinkling orifice 40 feeds into the drum water which has already been used to wash the grain in the following unit and which has been recycled, for economy reasons, by means of a pump 41.

The drum dips into a vat 42 in which the soda laden water is kept at a constant level and is discharged by means of an overflow orifice 43.

This unit comprises the same stirring means as those of the previous processing unit and are, in this instance, driven by the same motor 44. This unit is intended to separate the husks from the grain by an energetic stirring action under a strong stream of water.

The fourth processing unit 45 for washing the grains by carrying off the husks detached in the preceding unit is identical to the previous unit but is not provided with grain stirring means other than the helical partition itself.

A duct 46 and a sprinkling orifice 47 feed into the drum the water which has been used for the final washing of the grains in the last processing unit and which is recycled by means of a pump 48.

The water issuing from the drum and carrying off the husks is kept in the vat 49 at a constant level and is discharged by means of an overflow orifice 50. This husk laden water passes through a vibrating screen 51 which holds back the husks and is fed, through the intermediary of a large sized vat 52 acting as a "compensator," to the above mentioned recycling pump 41.

The fifth processing unit 53, for neutralizing the excess attacking agent with an acid solution, is in all respects identical to the processing unit described for the first embodiment of the installation. A duct 54 and a sprinkling orifice 55 enable the acid solution, here 0.5 percent aqueous solution of hydrochloric acid to be fed into the drum.

The sixth processing unit 56, for the final washing of the wheat grains, is identical to the third processing unit but it does not comprise the stirring screw-blade carrying shafts.

This processing unit is supplied with fresh water by means of a duct 57 and of a water pouring orifice 58 enabling the grains to be flushed with a strong jet of water.

The water which has been used for this final washing operation of the grains passes, upon issuing from the drum, into a vat 59 in which the level of the liquid is kept constant by an overflow discharge orifice 60. From this vat, the water is recycled, for economy reasons, by means of the above mentioned pump 48 and through the intermediary of a reservoir 61 of large capacity acting as a "compensator," into the fourth processing unit, as stated above.

The six processing units of the installation are arranged in series so that the drums have a common horizontal axis, the narrower ends at the small base of each of the frustoconical drums extending partly into the central orifice of the large base of the drum belonging to the following processing unit.

Each drum rests or at least one pair on rotating rollers not shown in FIG. 5, which rollers serve to support, and possibly to transmit thereto, the rotary motion about its horizontal axis.

The grains to be processed are fed by any known means, e.g. a metering hopper not shown in FIG. 5, into the first processing unit, i.e. the hydration unit, through the inlet orifice in the wall provided at the large base of this unit.

The grains are moved forward in continuous manner, as set forth in the description of the first embodiment of the installation according to the invention and pass from one processing unit to another so as to be subjected successively and in the order in which these processing units are arranged to the different operations of the above described chemical peeling method.

The different processing times are achieved by suitably choosing the dimensions of the drums, in particular their length as by adjoining to the frustoconical drum a cylindrical drum of desired length, the pitch of the screw formed by the helical partition and the speed at which each of these drums is rotated. This speed can be the same for all drums or each drum can be driven at a different rotational speed. The rotational motion of the drums is transmitted either directly to each drum or to at least one of the rollers supporting the said drum. Even a joint motion could be had between two of the processing drums or even between all of the drums in which case the whole of the installation could be driven by a single motor.

We claim:

1. An installation for chemically peeling wheat grains, which comprises at least one hydration unit for grains including a cylindrical extension at the inlet thereof, at least one unit for bringing the grains into contact with an alkaline attacking agent including means for stirring the grains, at least one unit for bringing the grains into contact with a diluted solution of the alkaline attacking agent so as to detach the husks from the grains and including means for stirring the grains and a wall with an annular zone provided with perforations, at least one processing unit for washing the grains so as to separate the husks and including a wall with an annular zone provided with perforations, at least one processing unit for bringing the grains into contact with a dilute solution of acid to neutralize the excess of alkaline attacking agent, and at least one processing unit for the final washing of the grains and including a wall with an annular zone provided with perforations, said units being arranged in the above order in the direction of travel of the grains, each of said units comprising a horizontally disposed frustoconical drum having a large base with a wall provided with a central inlet orifice, and a small base constituting an outlet orifice, an internal helical partition arranged along the entire length of the drum and rigid therewith, the pitch of the screw formed by the partition increasing progressively towards the outlet orifice, and means for rotating the drum about the longitudinal axis thereof, such that grains introduced through the inlet orifice will, upon rotation of the drum, progressively be moved at a constant flow rate towards the outlet orifice by the helical partition while at the same time remaining in contact with liquid contained at the lower portion of the drum and be discharged through the outlet orifice, said units being connected in series with one another so that the outlet orifice at the small base of each frustoconical drum extends into the central inlet orifice at the large base of the following drum, the installation further comprising means for recycling the final washing water into the processing unit for washing the grains to separate the husks therefrom, means for separating the husks from the water issuing from this latter unit and means for recycling the water thus free of husks into the unit for detaching the husks from the grains by bringing the grains into contact with the diluted solution of alkaline attacking agent.